United States Patent
Cho et al.

(10) Patent No.: US 8,452,288 B2
(45) Date of Patent: May 28, 2013

(54) METHOD FOR HANDOVER WITH CONSIDERATION OF THE NEIGHBOR BASE STATIONS' CIRCUMSTANCES

(75) Inventors: Hee Jeong Cho, Anyang-si (KR); Ki Seon Ryu, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 353 days.

(21) Appl. No.: 12/920,585

(22) PCT Filed: Apr. 17, 2009

(86) PCT No.: PCT/KR2009/002013
§ 371 (c)(1),
(2), (4) Date: Sep. 1, 2010

(87) PCT Pub. No.: WO2009/145506
PCT Pub. Date: Dec. 3, 2009

(65) Prior Publication Data
US 2011/0014916 A1    Jan. 20, 2011

(30) Foreign Application Priority Data
May 29, 2008  (KR) .................. 10-2008-0050208

(51) Int. Cl.
*H04W 36/00* (2009.01)
(52) U.S. Cl.
USPC ..................... 455/436; 455/437; 370/331
(58) Field of Classification Search
USPC ............. 455/436–444; 370/310, 328, 329, 370/331–334, 338
See application file for complete search history.

(56) References Cited

U.S. PATENT DOCUMENTS

| | | | |
|---|---|---|---|
| 5,953,320 A | 9/1999 | Williamson et al. | |
| 6,201,969 B1 | 3/2001 | Meier | |
| 7,155,223 B2 | 12/2006 | O'Brien | |
| 7,693,520 B2 * | 4/2010 | Kang et al. | 455/436 |
| 7,702,289 B2 * | 4/2010 | Tzavidas et al. | 455/69 |
| 2007/0037576 A1 * | 2/2007 | Subramanian et al. | 455/436 |
| 2007/0058523 A1 | 3/2007 | Cho et al. | |
| 2009/0005052 A1 | 1/2009 | Abusch-Magder et al. | |
| 2009/0149179 A1 * | 6/2009 | Shim et al. | 455/436 |

FOREIGN PATENT DOCUMENTS

| | | |
|---|---|---|
| KR | 10-0790139 | 1/2008 |
| WO | 2007-024110 | 3/2007 |

* cited by examiner

*Primary Examiner* — Matthew Sams
(74) *Attorney, Agent, or Firm* — Lee, Hong, Degerman, Kang & Waimey

(57) ABSTRACT

A method for a handover with consideration of neighbor base stations' circumstances is disclosed. The method for a handover with consideration of neighbor base stations' circumstances by a mobile station in a wireless communication system includes transmitting a handover request (MOB_M-SHO-REQ) message to a serving base station, receiving a handover response (MOB_BSHO-RSP) message including a base stations list made with consideration of the neighbor base station's circumstances from the serving base station, and selecting a base station among neighbor base stations except some base stations of the base stations list and transmitting a handover indicate (MOB_HO_IND) message including a information of the selected base station to the serving base station.

8 Claims, 3 Drawing Sheets

METHOD FOR HANDOVER WITH CONSIDERATION OF THE NEIGHBOR BASE STATIONS' CIRCUMSTANCES

CROSS-REFERENCE TO RELATED APPLICATIONS

This application is a 371 U.S. national stage application of International Application No. PCT/KR2009/002013, filed on Apr. 17, 2009, which claims the benefit of earlier filing date and right of priority to Korean Patent Application No. 10-2008-0050208, filed on May 29, 2008, the contents of all of which are hereby incorporated by reference herein in their entireties.

TECHNICAL FIELD

The present invention relates to a wireless communication system, and more particularly, to a method for a handover with consideration of neighbor base stations' circumstances

BACKGROUND ART

In connected to a base station or acquiring a basic connection identifier (Basic CID), a mobile station perform handover to move into an area close to another base station or to be served as better quality of service. Handover can be initiated by a request of a base station or a mobile station. When a mobile station requests handover, handover is initiated through a mobile station's handover request (MOB_MSHO-REQ) message, and when a base station requests handover, handover is initiated through a base station's handover request (MOB_BSHO-REQ) message.

FIG. 1 illustrates a flow of messages in process of handover initiated by a mobile station.

After a mobile station decided to perform handover based of strength of signals of neighbor base stations (100), it transmits a handover request (MOB_MSHO-REQ) message to a serving base station (110). The serving base station is a base station connected to the mobile station.

The serving base station transmits a handover response (MOB_BSHO-RSP) message, which includes a recommended base stations list, to the mobile station (120).

The mobile station selects a base station for handover referring the recommended base stations list and a list that the mobile station has (130), and transmits a handover indicate (MOB_HO_IND) message to the serving base station (140).

FIG. 2 illustrates a flow of messages in process of handover initiated by a base station.

After a serving base station decides that a mobile station must perform handover, it transmits a handover request (MOB_BSHO-REQ) message, which includes a recommended base stations list, to a mobile station (200, 210).

The mobile station selects a base station for handover in a recommended base stations list, or decides to refuse a handover request of the serving base station. And the mobile station transmits a handover indicate (MOB_HO_IND) message (240). The handover indicate message includes information of the selected base station or the decision of refusing a handover request.

A serving base station makes a recommended base stations list based on information of neighbor base stations collected through a network and transmits it to a mobile station. Then the mobile station decides a target base station referring to the recommended base stations list. But the mobile station can perform handover to a base station which is not included in the recommended base stations list and can not serve a mobile station because of restart caused by an error or overload. If a mobile station performs handover to a base station that has overload or is expected to restart, the service of the base station will be terminated after handover.

FIG. 3 illustrates a case in that a service for a mobile station is terminated because of a base station's problem after handover.

Referring to FIG. 3, after a mobile station decided to perform handover, it transmits a handover request (MOB_M-SHO-REQ) message to a serving base station (310).

The serving base station transmits handover response (MOB_BSHO-RSP) message, which includes a recommended base stations list to the mobile station (320). In FIG. 3, base stations B, C and D are included in the recommended base stations list.

And a base station A(T-BS A) encounters or expected to encounter an error. The mobile station selects a base station for handover referring the recommended base stations list, and transmits a handover indicate (MOB_HO_IND) message to the serving base station (330). In FIG. 3, the handover indicate message includes information of the selected base station (T-BS A).

Even if the mobile station can perform network entry to the base station A (T-BS A) and be serviced by the base station A (T-BS A) (340), the service of the base station A (T-BS A) will be terminated when the base station A (T-BS A) restarts because of an error (350).

Whenever a base station restarts, it increases a parameter of restart count by 1, and sends the parameter of restart count to a mobile station through a downlink channel descriptor (DCD) or a super frame header (SFH). Comparing a value of the parameter of restart count with a previous value of a parameter of restart count, the mobile station can know whether the base station restarted or not. In case that the value of the parameter of restart count increased, the mobile station performs network entry again and registers the base station.

Thus, the mobile station performs network entry again after the base station A completes restart (360).

DISCLOSURE OF INVENTION

Technical Problem

An object of the present invention is to provide a method for handover with consideration of the neighbor base stations' circumstances, which makes a mobile station perform handover to a proper base station.

Technical Solution

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for a handover with consideration of neighbor base stations' circumstances by a mobile station in a wireless communication system comprises: transmitting a handover request (MOB_MSHO-REQ) message to a serving base station; receiving a handover response (MOB_BSHO-RSP) message including a base stations list made with consideration of the neighbor base station's circumstances from the serving base station; and selecting a base station among neighbor base stations except some base stations of the base stations list and transmitting a handover indicate (MOB_HO_IND) message including a information of the selected base station to the serving base station.

The method may further comprise: performing network entry to the selected base station.

The base stations list may include a recommended base stations list made with consideration of neighbor base stations' channel quality and a not-recommended base stations list including base stations expected to restart.

The base stations list may be included in the handover response message as a TLV form.

In another aspect of the present invention, a method for a handover with consideration of neighbor base stations' circumstances by a mobile station in a wireless communication system comprises: receiving a handover request (MOB_B-SHO-REQ) message comprising a base stations list made with consideration of the neighbor base stations' circumstances from a serving base station; and selecting a base station among neighbor base stations except some base stations of the base stations list and transmitting a handover indicate (MOB_HO_IND) message including a information of the selected base station to the serving base station.

The method may further comprise: performing network entry to the selected base station.

In a further aspect of the present invention, a method for supporting a handover of a mobile station with consideration of neighbor base stations' circumstances by a base station in a wireless communication system comprises: receiving a handover request (MOB_MSHO-REQ) message from the mobile station; transmitting a handover response (MOB_B-SHO-RSP) message including a base stations list made with consideration of the neighbor base station's circumstances to the mobile station; receiving a handover indicate (MOB_HO_IND) message including an information of a base station which is selected by the mobile station among neighbor base stations except some base stations of the base stations list from the mobile station; and transmitting a handover confirm message to the selected base station.

In a further aspect of the present invention, a method for supporting handover of a mobile station with consideration of neighbor base stations' circumstances by a base station in a wireless communication system comprises: making a base stations list with consideration of the neighbor base stations' circumstances; transmitting a handover request (MOB_B-SHO-REQ) message including the base stations list to the mobile station; receiving a handover indicate (MOB_HO_IND) message including an information of a base station which is selected by the mobile station among neighbor base stations except some base stations of the base stations list from the mobile station; and transmitting a handover confirm message to the selected base station.

Advantageous Effects

The present invention allows the serving base station to inform the mobile station of the list of not-recommended base station for handover using the neighbor base stations' circumstances. Thus, the mobile station to perform handover to the most proper base station and be serviced continuously,

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

In the drawings.

MODE FOR THE INVENTION

Reference will now be made in detail to the exemplary embodiments of the present invention, examples of which are illustrated in the accompanying drawings. The exemplary embodiments of the invention may be modified in various forms and the invention should not be limited to the specific embodiments described herein.

If a mobile station can acquire information about a restart probability and an error of a target base station during transmitting and receiving messages for handover with a serving base station, the mobile station can perform handover to a proper base station and be serviced continuously by the proper base station.

Thus, according to an exemplary embodiment of the present invention, a serving base station includes a list of not-recommended neighbor base stations that cannot serve a mobile station because of restart or over-load and a list of base stations proper for handover in a handover request (MOB_B-SHO-REQ) message or a handover response (MOB_BSHO-RSP) message, and transmits them. The list of not-recommended neighbor base stations can be included in the handover request message or the handover response message as a mandatory field or an optional field as a TLV (type, length, value) form.

Figure 1:
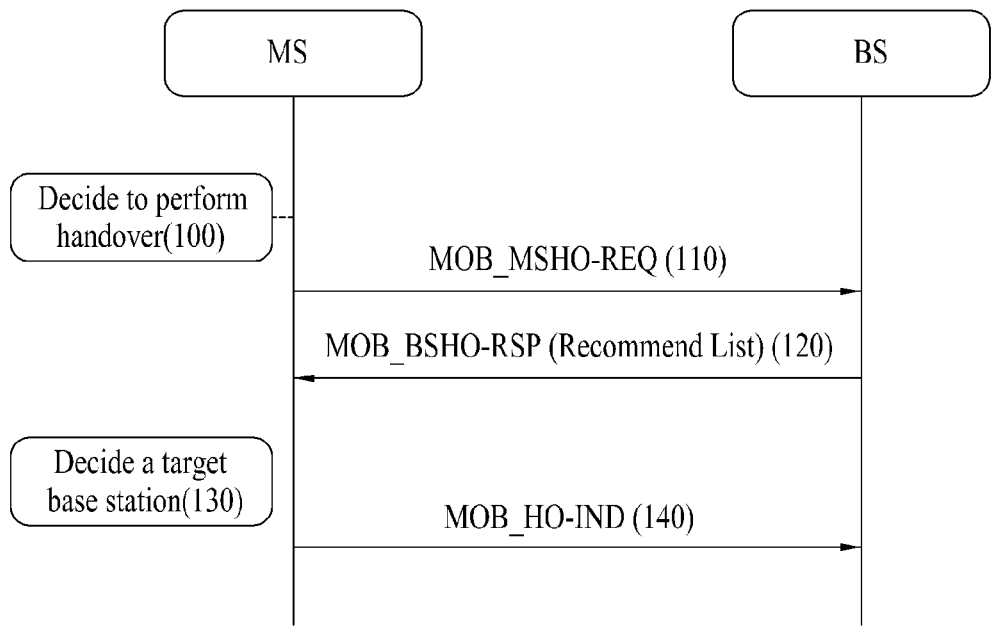
FIG. 1 illustrates a flow of messages in process of handover initiated by a mobile station.
Figure 2:
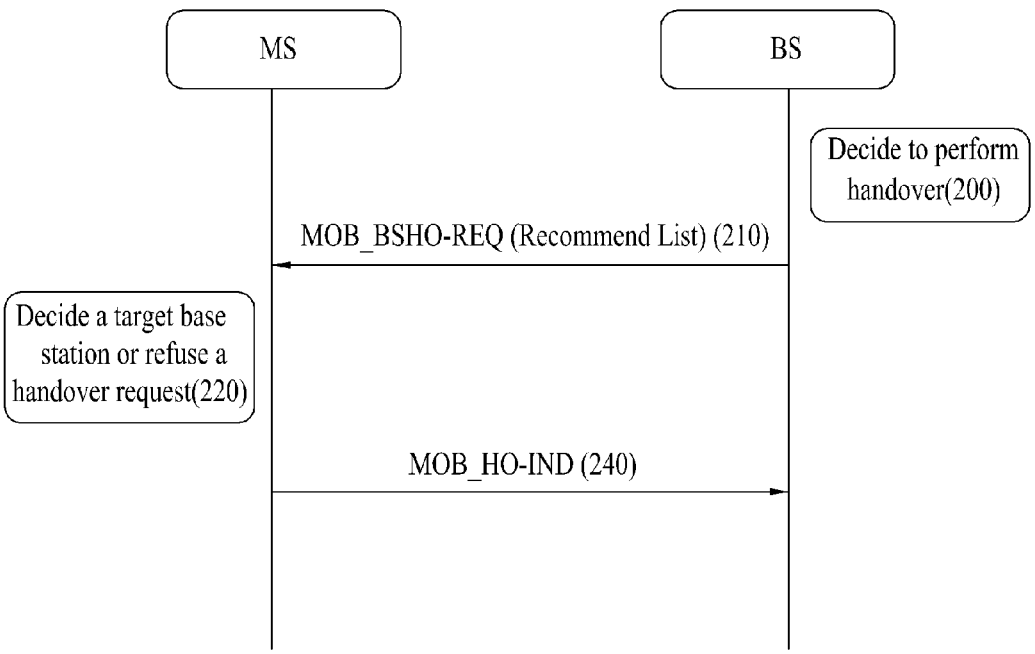
FIG. 2 illustrates a flow of messages in process of handover initiated by a base station.
Figure 3:
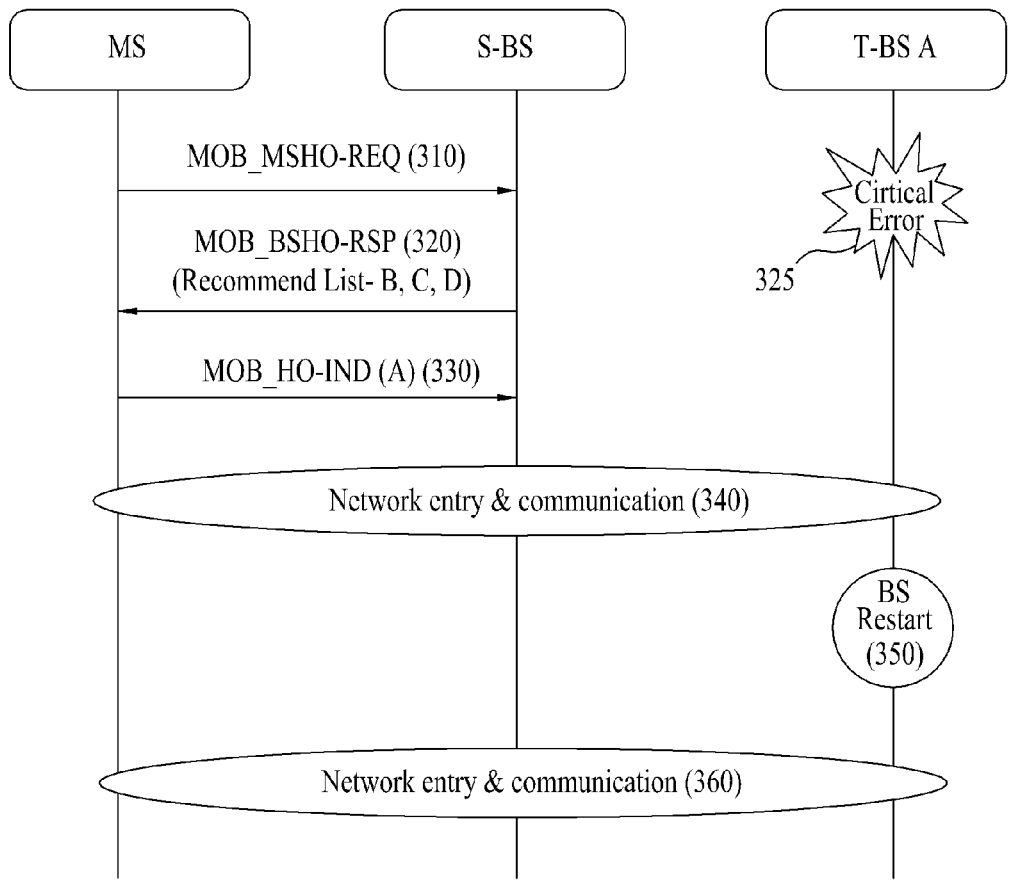
FIG. 3 illustrates a case in that a service for a mobile station is terminated because of a base station's problem after handover.
Figure 4:
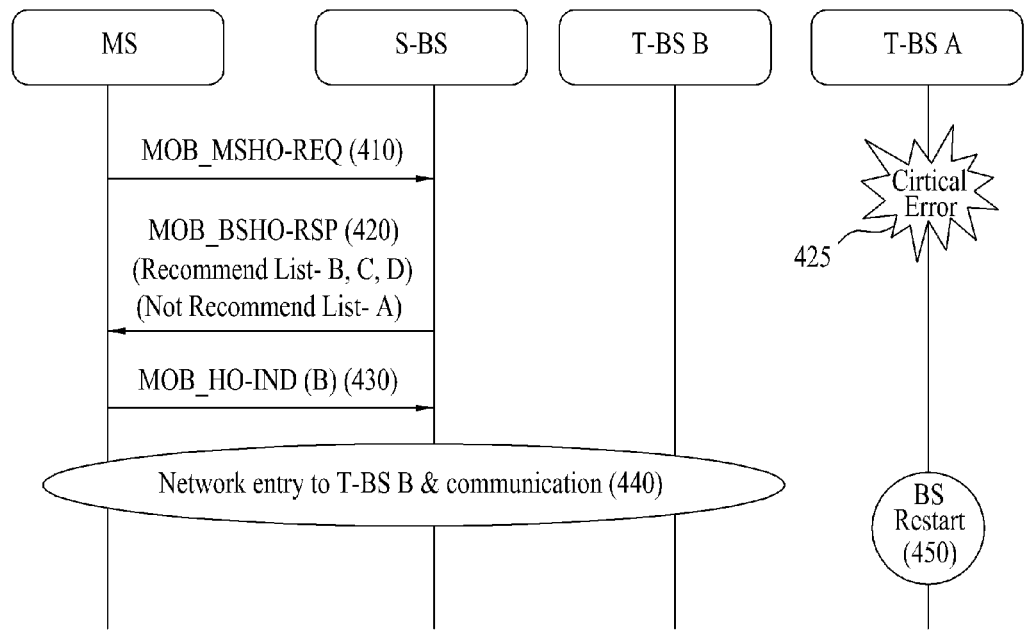
FIG. 4 illustrates a method for a handover with consideration of a neighbor base station's circumstances according to an exemplary embodiment of the present invention.

FIG. 4 illustrates a method for a handover with consideration of neighbor base stations' circumstances according to an exemplary embodiment of the present invention.

As a serving base station broadcasts network configuration information thorough a neighbor advertisement (MOB-NBR-ADV) message, it informs all mobile stations in a cell of the serving base station of information of neighbor base stations.

A mobile station scans neighbor base stations and performs handover based on channel quality information of neighbor base stations which is acquired through the scanning.

After a mobile station decided to perform handover, it transmits a handover request (MOB_MSHO-REQ) message to a serving base station (410). The handover request message (MOB_MSHO-REQ) can include channel quality information of signals received from neighbor base stations.

The serving base station transmits a handover response (MOB_BSHO-RSP) message, which includes a recommended base stations list and a not-recommended base stations list, to the mobile station (420). In FIG. 4, the recommended base stations list includes base station B, C, D and the not-recommended base stations list includes base station A.

The mobile station selects a base station for handover referring the recommended base stations list and the not-recommended base stations list. When the mobile station selects the base station for handover, it excepts the base station A which is included in the not-recommended base station list. That is, even if the base station A is the most proper base station for handover according to channel quality, the mobile station does not select the base station A. In FIG. 6, the base station B is selected.

The base station A is expected to restart because of an error (450).

Restart of a base station is performed in case of a break down of core equipments and during or after upgrade of the base station. And it can be performed because of establishment and removal of the base station and check of a hardware and/or a software of the base station.

The serving base station has to know a restart probability of the neighbor base stations. The serving base station receives information of the neighbor base stations from a network entity managing the neighbor base stations and can be aware of the restart probability of the neighbor base stations. The network entity can be radio network controller (RNC), base station controller (BSC), Mobile switching center (MSC) and so on.

If the serving base station is aware of over-load of a base station, it can include the base station in over-load in the not-recommended base stations list. And the serving base station can include some base station in the not-recommended base stations list with other reasons.

The mobile station transmits a handover indicate (MOB_HO_IND) message (430). In FIG. 4, information of the selected base station (T-BS B) is included in the handover indicate message.

The serving base station informs a target base station (T-BS B) that the mobile station will perform handover to the target base station, and disconnects an ARQ connection assigned to the mobile station and all connections related to data transmission.

The mobile station can served by the base station B (T-BS B) continuously (440).

Figure 5:
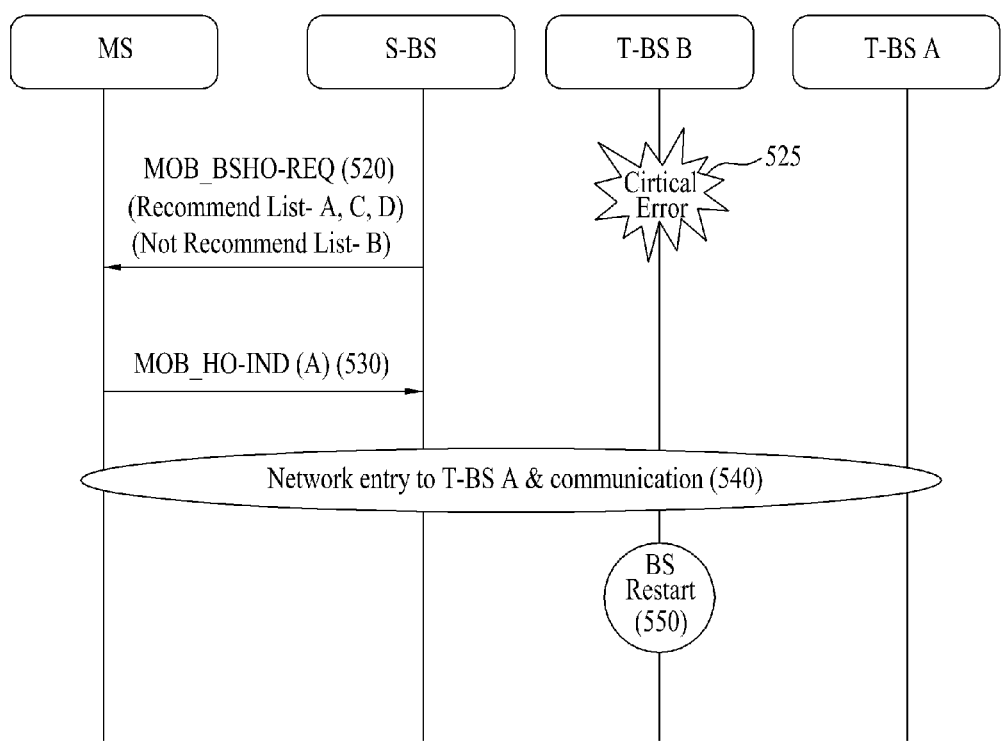
FIG. 5 illustrates a method for a handover with consideration of a neighbor base station's circumstances according to another exemplary embodiment of the present invention.

FIG. 5 illustrates a method for a handover with consideration of a neighbor base station's circumstances according to another exemplary embodiment of the present invention.

After a serving base station decides that a mobile station must perform handover, it transmits a handover request (MOB_BSHO-REQ) message (520). The handover request message includes a recommended base stations list and a not-recommended base stations list. In FIG. 5, a recommended base stations list includes base stations A(T-BS A), C, D and a not-recommended base stations list includes a base station B(T-BS B).

The mobile station selects a base station for handover referring the recommended base stations list and the not-recommended base stations list. When the mobile station selects a base station, it excepts the base station B which is included in the not-recommended base station list. That is, even if the base station B is a most proper base station for handover according to channel quality, the mobile station does not select the base station B.

The base station B is expected to encounter an error (525) and restart (550).

The mobile station transmits a handover indicate (MOB_HO_IND) message (530). In FIG. 5, information of the selected base station (T-BS A) is included in the handover indicate message.

The serving base station informs a target base station (T-BS A) that the mobile station will perform handover to the target base station, and disconnects an ARQ connection assigned to the mobile station and all connections related to data transmission.

The mobile station can served by the base station A (T-BS A) continuously (540).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention relates to handover, and more particularly, to a method for handover that makes a mobile station to select the most proper base station and be served continuously. The present invention is applicable base stations and mobile stations of an IEEE 802.16m system, an IEEE 802.16e system, and so on.

The invention claimed is:

1. A method for handover in a wireless communication system, the method performed by a mobile station and comprising:
    transmitting a handover request message;
    receiving a handover response message that includes a base stations list generated in consideration of circumstances of neighbor base stations in the list;
    selecting a base station from only a portion of the neighbor base stations in the list; and
    transmitting a handover indicate message that includes information related to the selected base station,
    wherein the base station list includes at least one recommended base station in consideration of channel quality and at least one not-recommended base station that is expected to restart.

2. The method of claim 1, further comprising:
    performing network entry to the selected base station.

3. The method of claim 1, wherein the base stations list in a type, length, value (TLV) form.

4. A method for handover in a wireless communication system, the method performed by a mobile station and comprising:
    receiving a handover request message that includes a base stations list generated in consideration of circumstances of neighbor stations in the list;
    selecting a base station from only a portion of the neighbor base stations in the list; and
    transmitting a handover indicate message that includes information related to the selected base station,
    wherein the base station list includes at least one recommended base station in consideration of channel quality and at least one not-recommended base station that is expected to restart.

5. The method of claim 4, further comprising:
    performing network entry to the selected base station.

6. A method for supporting a-handover of a mobile station in a wireless communication system, the method performed by a base station and comprising:
    receiving a handover request message;
    transmitting a handover response message that include a base stations list generated in consideration of circumstances of neighbor base stations in the list;

receiving a handover indicate message that includes information related to a base station selected by the mobile station from only a portion of the neighbor base stations in the list; and transmitting a handover confirm message to the selected base station, wherein the base station list includes at least one recommended base station in consideration of channel quality and at least one not-recommended base station that is expected to restart.

7. The method of claim 6, wherein the base stations list generated from information related to neighbor base stations that is broadcast by a network entity that manages the neighbor base stations.

8. A method for supporting handover of a mobile station in a wireless communication system the method performed by a base station and comprising:

generating a base stations list in consideration circumstances of the neighbor base stations in the list;

transmitting a handover request message that includes the base stations list;

receiving a handover indicate message that includes information related to a base station selected by the mobile station from only a portion of the neighbor base stations in the list; and transmitting a handover confirm message to the selected base station, wherein the base station list includes at least one recommended base station in consideration of channel quality and at least one not-recommended base station that is expected to restart.

* * * * *